June 23, 1959 J. S. KILBY 2,892,130

PLUG-IN CIRCUIT UNITS

Filed Dec. 16, 1953 3 Sheets-Sheet 1

INVENTOR.
JACK S. KILBY
BY John W. Michael
ATTORNEY

June 23, 1959 J. S. KILBY 2,892,130

PLUG-IN CIRCUIT UNITS

Filed Dec. 16, 1953 3 Sheets-Sheet 2

INVENTOR.
JACK S. KILBY
BY John W. Michael
ATTORNEY

June 23, 1959

J. S. KILBY 2,892,130

PLUG-IN CIRCUIT UNITS

Filed Dec. 16, 1953

3 Sheets-Sheet 3

*INVENTOR.*
JACK S. KILBY
BY
John W. Michael
ATTORNEY

United States Patent Office 2,892,130

Patented June 23, 1959

2,892,130

PLUG-IN CIRCUIT UNITS

Jack S. Kilby, Milwaukee, Wis., assignor to Globe-Union Inc., Milwaukee, Wis., a corporation of Delaware Application December 16, 1953, Serial No. 398,464

11 Claims. (Cl. 317—101)

This invention relates to improvements in electrical circuit units and particularly such units which embody the components required for a single stage of an electronic circuitry and are easily connected with other such units to form complete circuits for apparatus such as radio and television receivers.

It is an object of this invention to provide such a unit which may be inexpensively manufactured.

Another object of this invention is to provide such a unit which may be readily assembled to and disconnected from a base plate having other circuitry to provide a multistage electronic circuit.

In obtaining these objects there is employed a base plate having on its surface conductors extending between prongs or prong receiving openings. A multiplicity of single stage units, such as frequency modifiers, video and sound amplifiers, limiters and detectors are plugged into such base plate to make the complete circuit. In its general aspects each single stage unit consists of a unit plate of insulating material having on its faces capacitor plates, resistors, conductors, and prong engaging or prong holding conductive areas. The unit plate has a bottom edge recess in which a tube socket is seated, locked and held by its connectors being secured to such conductors. When the edge of the stage unit is seated on the face of the base plate the prongs and prong holding areas engage to make the electrical connections and provide some mechanical support. The socket has locking feet which project through an opening in the base plate and are engaged by a resilient removable locking ring to hold the unit in plugged-in place. Upon removal of the locking ring the stage unit may be disconnected from the base plate and another stage unit substituted. The prongs and prong holding areas easily connect and disconnect.

Each stage unit may also include tubular capacitors mounted in apertures in the unit plate, and inductances mounted in slots in the edge of such unit plate. One solder dipping will suffice to attach the tubular capacitors, the tube socket and the inductances.

For a more detail description of this invention reference should be made to the following description of a specific embodiment read in connection with the accompanying drawings, in which.

Figures 1, 2, 3:
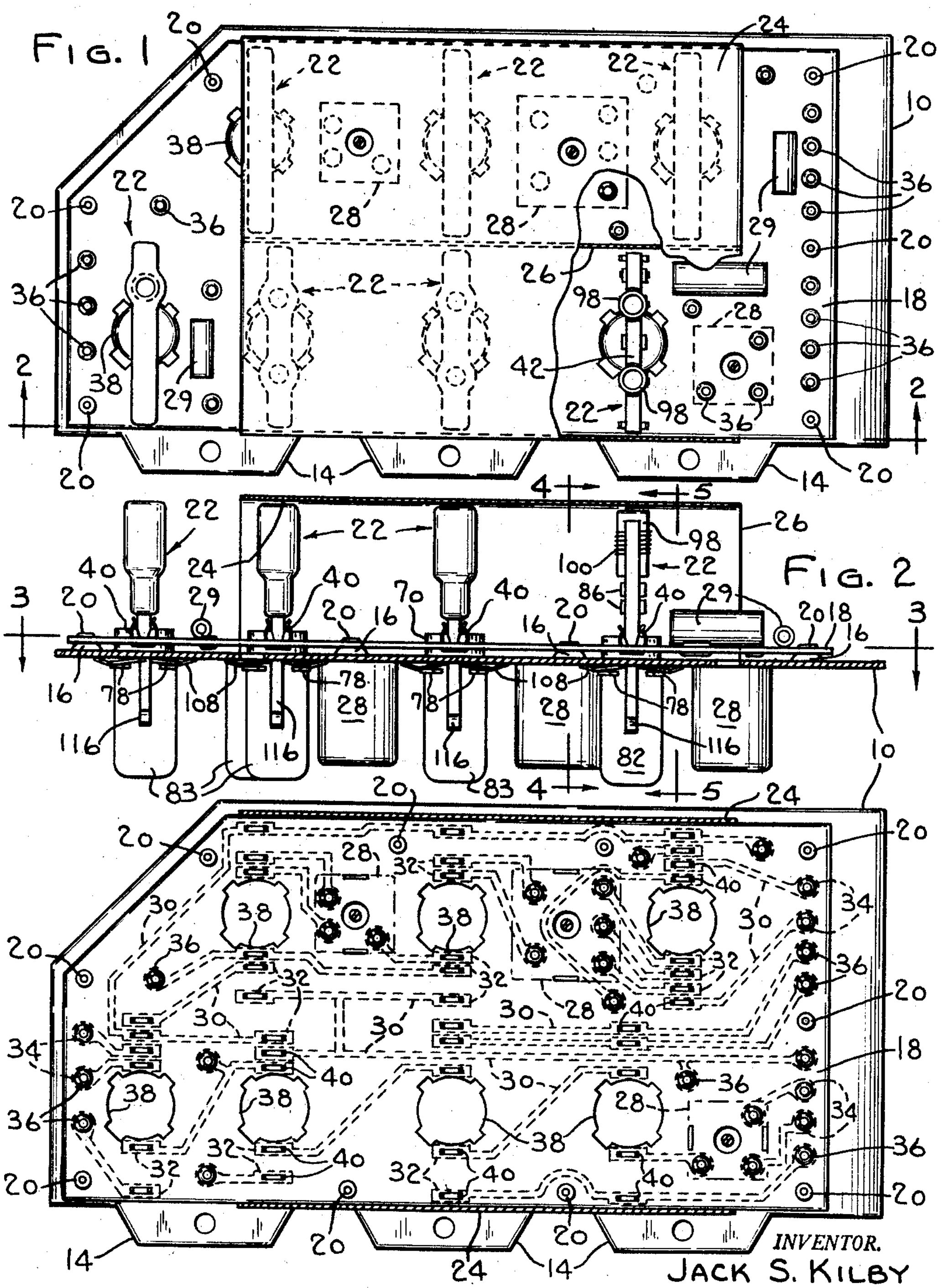
Fig. 1 is a top plan view of a multistage electronic circuit device with changeable single stage units embodying the present invention.
Fig. 2 is a sectional view taken on the line 2—2 of Fig. 1.
Fig. 3 is a sectional view taken on the line 3—3 of Fig. 2 with the single stage units removed.

The assembled device forming a complete electronic circuit with multiple changeable stage units shown in Figs. 1 to 3 inclusive includes a metal mounting plate 10 to which is secured in spaced parallel relationship a base plate 18 of insulating material for mounting and electrically interconnecting single stage units 22. The metal mounting may have attached to its lower side, as indicated, a number of adjustable inductances 28, the adjusting screws of which may be reached through openings formed in the base plate and shield. The metal mounting plate 10 may be provided with apertured wings 14 by which the plate is secured to the chassis of a radio or television receiver or the like. The metal plate has upwardly raised pads 16 to which the base plate 18 is secured by eyelets 20. Some of the single stage units 22 may be shielded by a metal shield 24 and a central partition 26 both of which are removably mounted on the metal mounting plate 10 by suitable means. The single stage units 22 for example may comprise the following starting with the lower right hand corner of Fig. 1 and proceeding counterclockwise: 1st intermediate frequency amplifier (I.F.); 2nd I.F. amplifier; 3rd I.F. amplifier; video amplifier, sound amplifier, limiter and ratio detector. Various fixed resistors, capacitors or inductances indicated at 29 may be attached by connecting wires to the base plate 18.

Figures 4, 5, 6, 8:
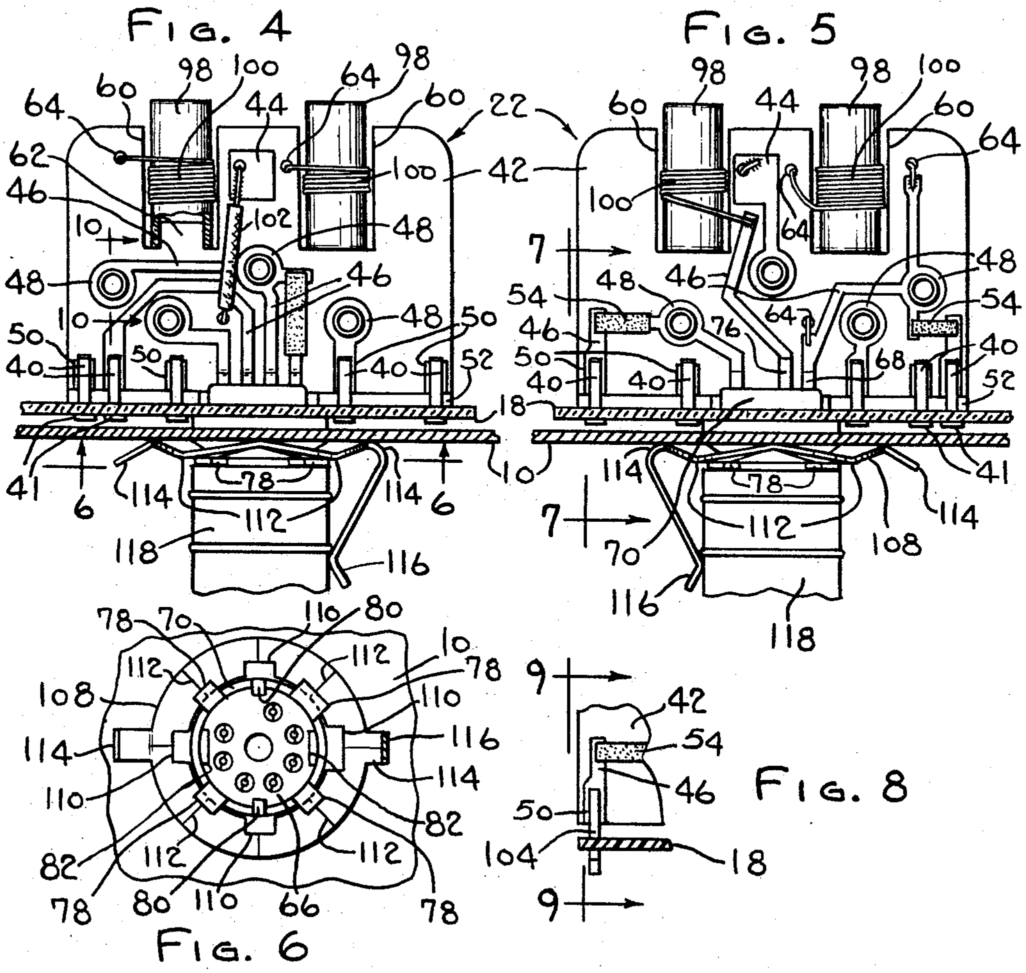
Fig. 4 is an enlarged fragmentary sectional view taken on the line 4—4 of Fig. 2.
Fig. 5 is a fragmentary enlarged sectional view taken on the line 5—5 of Fig. 2.
Fig. 6 is a fragmentary bottom plan view taken on the line 6—6 of Fig. 4 with the tube and shield removed.
Fig. 8 is a fragmentary sectional view like Fig. 7 of another modification of the spring prong and prong engaging conductive areas.
Figure 7:
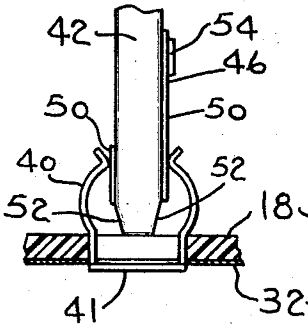
Fig. 7 is an enlarged fragmentary sectional view taken on the line 7—7 of Fig. 5 showing one modification of the spring prongs and prong engaging conductive areas.

The principal function of the base plate 18 is to provide electrical interconnection for the single stage units 22. It also functions, in cooperation with the mounting plate 10, to provide mechanical support for such units. The base plate 18 is made of a rigid insulating material and has formed on the lower face thereof a plurality of non-crossing conductive paths indicated at 30 in the broken lines. These paths have at desired places enlarged rectangular areas 32 and enlarged circular areas 34. The paths and the areas may be made by the etching method described in Patent No. 2,441,960, issued May 26, 1949, to Paul Eisler. The rectangular and circular areas may have holes of like shape, in any event rectangular holes and circular holes are punched in such areas and through the base plate 18 so that such areas may be reached from the top side of such base plate. For the sake of conveniently attaching wire connectors and the fixed resistances and capacitors 29 and the like circular holes may have eyelets 36 extending through the base plate. In alinement with a selected line of rectangular areas 32 the base plate and mounting plate are provided with tube receiving holes 38 which have angularly spaced notches. These holes will receive a tube socket having angularly spaced locking feet when the feet are properly alined with the notches. As is shown in Figs. 5 and 7, spring prongs 40 joined by a bridge portion 41 are inserted through the rectangular openings from the bottom and the bridge portion 41 are soldered to the rectangular areas 32. Thus the prongs are electrically secured to the conductive paths 30 and mechanically secured to the base plate.

Figure 10:
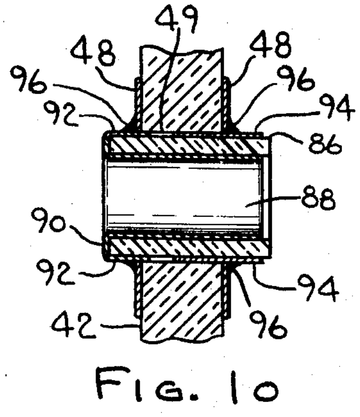
Fig. 10 is an enlarged fragmentary sectional view taken on the line 10—10 of Fig. 4.
Figure 11:
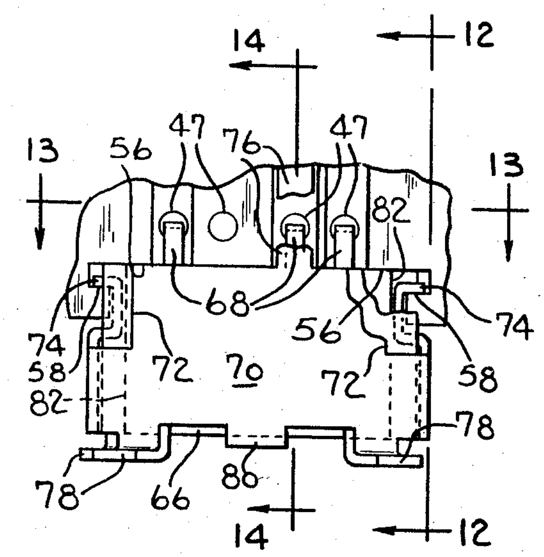
Fig. 11 is an enlarged fragmentary view in side elevation of the tube socket and base plate, parts broken away and shown in section.
Figure 12:
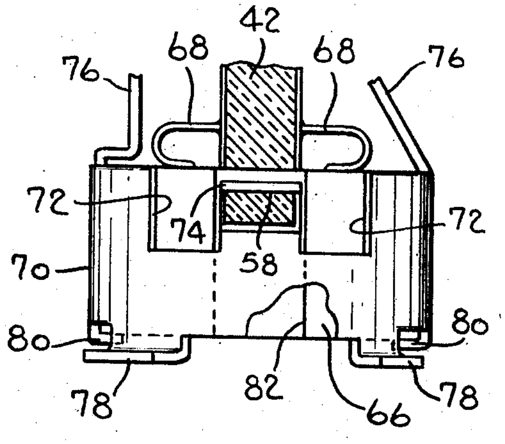
Fig. 12 is a view in side elevation taken from the line 12—12 of Fig. 11.
Figure 13:
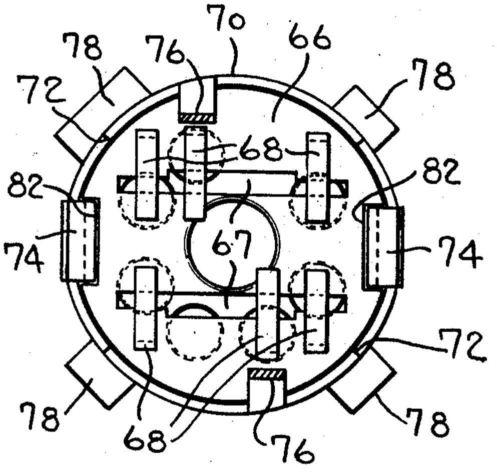
Fig. 13 is a top plan view taken from the line 13—13 of Fig. 11 with the base plate removed.

The single stage units indicated generally at 22 vary in their electrical circuit functions as pointed out. Therefore each unit has components differing in number and electrical characteristics mounted thereon. However, all units are made in the same manner and are very similar structurally. Therefore, only one unit will be described in detail. Each single stage unit is mounted on a ceramic plate 42 which is capable of providing a structural support for the stage unit as well as providing the dielectric for certain capacitors, the electrodes 44 of which are mounted on opposite sides of the plate 42. The electrodes 44 as well as conductors 46 and prong engaging areas 50 are applied to the surface of the plate 42 by the silver paint method well known in the printed circuit art. Some of the conductors have circular portions 48 which surround holes 49 (see Fig. 10) extending through the plate 42. The prong engaging conductive areas 50 are placed adjacent the lower edge on both sides of the plate 42 so that they are frictionally engaged by the prongs 40 (see Fig. 7) when the unit 22 is seated on the base plate 18. The conductors 46 which lead to the tube socket connectors may have shallow recesses 47 which receive the ends of such connectors. The bottom edge of the plate 42 may be beveled at 52 (see Fig. 7) to facilitate the proper insertion of the plate 42 into the spring prongs 40. Resistances 54 are placed where required. They are screened onto the plate and overlie the conductors in a manner well known to those skilled in the printed circuit art. As is shown in Fig. 11, the bottom edge of the plate 42 has recess 56 with top notches forming socket locking shoulders 58. The tube socket and method of locking it to the plate is hereinafter described. The top edge of the plate 42 has a pair of slots 60 with upwardly extending tongues 62 at their bottoms. The slots accommodate fixed tubular inductances. The plate 42 also has, where necessary, small holes 64 through which wire may pass from one to the other side of such plate.

Figure 14:
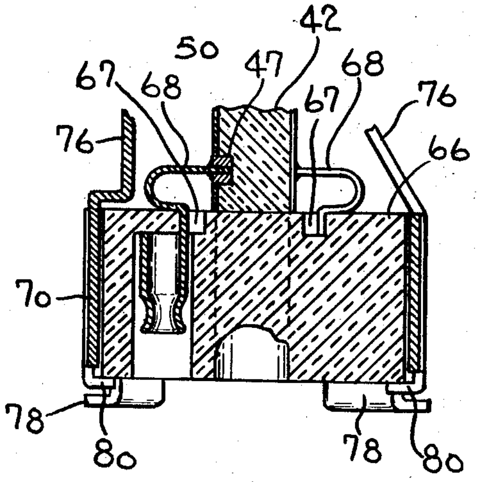
Fig. 14 is a fragmentary sectional view taken on the line 14—14 of Fig. 11.

The tube socket (see Figs. 11 to 14 inclusive) is specially constructed for the single stage unit so that it may be mounted on the lower edge of the plate 42 with its longitudinal axis parallel to the plane of such plate. This socket has an inner cylindrical ceramic member 66 with cylindrical chambers opening at the bottom thereof and terminating at the top in upper rectangular outlets 67. These outlets are arranged in parallel rows spaced about the thickness of the plate 42. Tube receiving terminals have prong engagers in such chambers with connectors 68 of rectangular cross section extending through the outlets 67. These connectors are bent as shown in Fig. 14 so that the ends thereof may be seated in the small recesses 47 when the tube socket is seated. A metallic cover 70 for the tube socket has locking fingers 74 projecting from the bottom of slots 72. These fingers have outturned ends engaging the shoulders 58 to hold the cover 70 in the recess 56. There are soldering lugs 76 which extend upwardly as shown and are soldered to certain of the conductors 46 to make the cover a ground and secure it to the plate 42. The cover has at its bottom end four angularly spaced locking feet 78 which will slide through the holes 38 when properly alined and project below the mounting plate 10. Intermediate these locking feet is a pair of tabs 80 which are bent over the bottom of the ceramic body 66 to hold the cover on it. The metal cover 70 is first inserted in the recess 56 with the locking fingers 74 positioned on the shoulders 58. Then the ceramic body 66, with its connectors assembled, is inserted within the cover 70. The ceramic body 66 has on its side slots 82 which receive the locking fingers 74 and overlap the sides of the recess 56. This prevents rotative movement of the socket and prevents it from becoming unseated while being soldered. In the seated position of the socket the connectors 68 fit in the recesses 47 and soldering lugs 76 overlap certain of the conductors 46 so that upon dip soldering both the ceramic body 66 and the metallic cover 70 will be electrically connected and mechanically secured to the plate 42. An electronic tube 83 of well known design is removably fitted in the tube socket after the unit 22 is secured to the base plate 18.

The single stage unit 22 also incorporates high rating tubular capacitors in such way that they may be easily installed and connected and not require additional space. To accomplish this the tubular capacitor includes a ceramic tube 86 made of a well known material to provide a relatively high dielectric constant. This tube has an inner electrode 88 which has a portion 90 extending around one end of the tube 86 and a small portion 92 on the outside of the tube 86. An outer electrode 94 is spaced from the portion 92 and extends nearly to the other end of the tube 86. The tubular capacitor is snugly fitted in the hole 49 so that portion 92 of the inner electrode will be adjacent the circular portions 48 on one side of the plate 42 and the outer electrode 94 will be adjacent the circular portions 48 on the other side of the plate 42. As so placed, the space between the portion 92 and the outer electrode 94 will be within the hole 49. When the plate 42 and capacitor 86 are dipped in solder, fillets of solder 96 will electrically and mechanically connect each electrode to the adjacent circular portions 48. Solder will not enter between the hole 49 and the tube to close the space between the electrodes. The end of the tube 86 opposite the portion 90 may be covered with a non-conductive material which will prevent the solder from bridging across such end and connecting the inner and outer electrodes.

Wire wound inductances of desired values have their coils 100 on an insulating supporting tube 98. These tubes with their wires are temporarily cemented in place in the slots 60 with the tongues 62 projecting into the tubes 98 as shown in Fig. 4. The ends of coils 100 in some instances are soldered to conductors on the same side of the plate 42 as the end leaves the coil. In other instances the ends pass through the holes 64 in such plate and are soldered to conductors on the side of the plate 42 opposite to which the end leaves the coil. If it is necessary for any conductor or wire to cross over and be insulated from a conductor on the plate, an insulating sleeve 102 may be placed on such wire.

Figure 9:
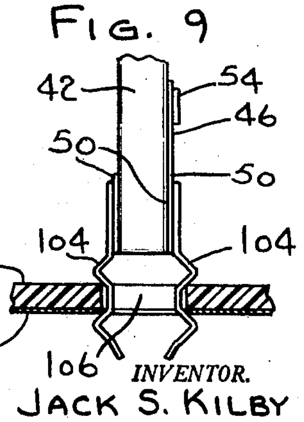
Fig. 9 is a fragmentary sectional view taken on the line 9—9 of Fig. 8.

A single solder dipping operation electrically connects and mechanically attaches all of the tubular capacitors, all of the connectors 68 of the tube socket and all of the ends of the wire coils 100 to the respective conductive areas on the plate 42. In case the modified form of spring prongs shown in Fig. 9 are used these may be also soldered to the body 42 at the same dipping. This method of assembly thus makes a saving in manufacturing cost.

Instead of securing the spring prongs to the base plate 18, a modified form of prong 104 shown in Figs. 8 and 9 may be directly secured to the ceramic plate 42. Each of the prongs 104 has a pair of spaced humps which engage opposite sides of the base plate 18 when the spring prongs are inserted through a hole 106 in such plate. The humps will make electrical contact with the conductive area 32 surounding such hole. In this modification the edge of the single stage unit may be spaced from the side of the base plate 18.

The tube socket is also utilized to form a mechanical lock for holding the single stage unit 22 to the base plate 18. As previously described, the base plate 18 and the metal mounting plate 10 are provided with alined holes 38 having circumferential angularly spaced notches. One of these notches and one of the locking feet 78 of the tube socket may be slightly larger than the others so that the single stage unit 22 can be inserted in only one position. When the single stage unit is seated as shown in Figs. 4 and 5, the locking feet 78 project below the mounting plate 10. A locking ring 108 has a central hole, the periphery of which has angularly spaced notches 110 which will permit the ring to be slid over the tube socket and its locking feet 78. The locking ring 108 between its notches 110 has low lines 112 which form camming surfaces adjacent such notches. After the locking ring has been placed over the tube socket it is rotated through approximately 45° while the camming surfaces draw the locking feet 78 down to resiliently lock the tube socket and the single stage unit 22 in place. It is preferable to provide the locking ring 108 with a pair of radial wings 114 by which such ring may be grasped for rotation. One of such wings may have a downward finger 116 which is biased inwardly to form a gripper for holding a tube shield 118 in place.

What I claim and desire to secure by this patent is:

1. In an electronic unit, an insulating plate having an opening therethrough, conductors on opposite sides of said plate adjacent the ends of said opening, a tubular capacitor in said opening, said capacitor having an inner electrode extending around one end thereof and terminating with an edge on the outside of said electrode, an outer electrode on said capacitor having its edge spaced from said first edge, said spacing being within said opening, and a metallic cementing material mechanically and electrically connecting said outer electrode to a conductor on one side of said plate and said inner electrode to a conductor on the other side of said plate.

2. In an electronic circuit unit, an insulating plate having conductors bonded on the surface thereof, holes through said plate and conductors, a slot cut in the periphery of said plate and having a bottom provided with an outwardly extending tongue, an insulating supporting tube having an external wire coil inductance mounted in said slot with the axis of said tube parallel to the plane of said plate and with said tongue inserted in an end of said tubular inductance, and the wire of said inductance passing through said holes and secured to said conductors.

3. In a single stage unit a ceramic plate having a plurality of conductors bonded to the surface on opposite sides thereof, a recess in the edge of said plate having an edge adjacent said conductors, small recesses in the sides of said plate adjacent said recess, a tube socket placed in said recess, said tube socket having rectangular outlets parallel with and adjacent the sides of said plate, flat connectors extending through said outlets and bent so that the ends thereof seat in said small recesses on opposite sides of said plate and are connectible with said conductors, and cementing means electrically and structurally interconnecting said connectors to said conductors.

4. The combination as claimed in claim 3 in which said tube socket has a metal cover and said cover has grounding terminals on opposite sides of said plate in alinement with conductors thereon and said cementing means electrically and mechanically interconnects said conductors and said terminals.

5. The combination as claimed in claim 4 in which said cover has locking feet extending radially thereof to provide means for holding said unit to a base plate.

6. The combination as claimed in claim 5 in which said cover has locking fingers and said recess has shoulders engaged by said locking fingers.

7. The combination as claimed in claim 6 in which said socket has slots which receive the edges of said recess to lock said socket against rotation with respect to said plate.

8. In an electronic single stage unit, a ceramic plate capable of providing a support for said unit, said plate having electrical components including conductors on opposite faces thereof, an opening through said plate having ends adjacent said conductors, a tubular capacitor in said opening having an inner electrode extending around one end thereof and positioned adjacent the conductor on one side of said plate, an outer electrode on said capacitor adjacent a conductor on the other side of said plate, a tube socket at the edge of said plate, said socket having connectors extending on opposite sides of said plate in alinement with conductors on said plate, said tubular capacitor and said tube socket being simultaneously soldered by a single dip.

9. A multistage electronic circuit having replaceable single stage units comprising a metal mounting plate, an insulating base plate secured to said mounting plate in parallel spaced relation thereto, a plurality of conductors on one face of said base plate, holes through said conductors and said base plate, spring prongs mounted in said holes and extending from the other face of said base plate, tube socket receiving openings in said base plate and mounting plate, a single stage unit including a plate having an electronic circuit with prong engaging areas on an edge of said plate, an electronic tube socket secured to said edge of said unit and projecting therebeyond, said single stage unit being mounted with its edge toward the face of said base plate and said prongs engaging said prong engaging areas with said tube socket projecting through said holes and means for locking said tube socket to said metal mounting plate.

10. The combination as claimed in claim 9 in which said locking means includes alined notches in the periphery of said openings adapted to permit the passage of locking feet therethrough, locking feet on the outer end of said tube socket adapted to fit through said notches and overlap the periphery of said openings, and spaced from the outer face of said metal mounting plate, and an inherently biased locking ring having camming surfaces engaging said metal mounting plate and said locking feet to hold said unit tightly assembled to said base plate.

11. A multistage electronic circuit having replaceable single stage units comprising a metal mounting plate, an insulating base plate secured to said mounting plate in parallel spaced relation thereto, a plurality of conductors on one face of said base plate, said mounting plate and base plate having a tube socket receiving opening, a single stage unit including a plate having an electronic circuit with prong engaging areas, a recess in one edge of said plate, an electronic tube socket secured in said recess and projecting through said opening, said single stage unit being mounted with said one edge toward the face of said base plate, prongs engaging said prong engaging areas and said conductors, and means for locking said tube socket to said metal mounting plate.

References Cited in the file of this patent

UNITED STATES PATENTS

| | | |
|---|---|---|
| 2,019,625 | O'Brien | Nov. 5, 1935 |
| 2,226,745 | Schrack | Dec. 31, 1940 |
| 2,417,420 | Knapp | Mar. 18, 1947 |
| 2,461,487 | Wagstaff | Feb. 8, 1949 |
| 2,464,377 | Cohen | Mar. 15, 1949 |
| 2,474,988 | Sargrove | July 5, 1949 |
| 2,507,488 | Buffington | May 16, 1950 |
| 2,613,244 | Del Camp | Oct. 7, 1952 |
| 2,734,151 | Jacobs | Feb. 7, 1956 |
| 2,742,627 | Lazzery | Apr. 17, 1956 |
| 2,755,048 | Warsher | July 17, 1956 |
| 2,760,058 | Gross | Aug. 21, 1956 |
| 2,764,713 | Alden | Sept. 25, 1956 |

FOREIGN PATENTS

| | | |
|---|---|---|
| 562,577 | Great Britain | July 7, 1944 |